March 24, 1953     W. H. SILVER     2,632,373
CULTIVATOR TOOL-BAR CONNECTION

Filed June 28, 1947     2 SHEETS—SHEET 1

INVENTOR.
WALTER H. SILVER
BY
ATTORNEYS

March 24, 1953 W. H. SILVER 2,632,373
CULTIVATOR TOOL-BAR CONNECTION
Filed June 28, 1947 2 SHEETS—SHEET 2
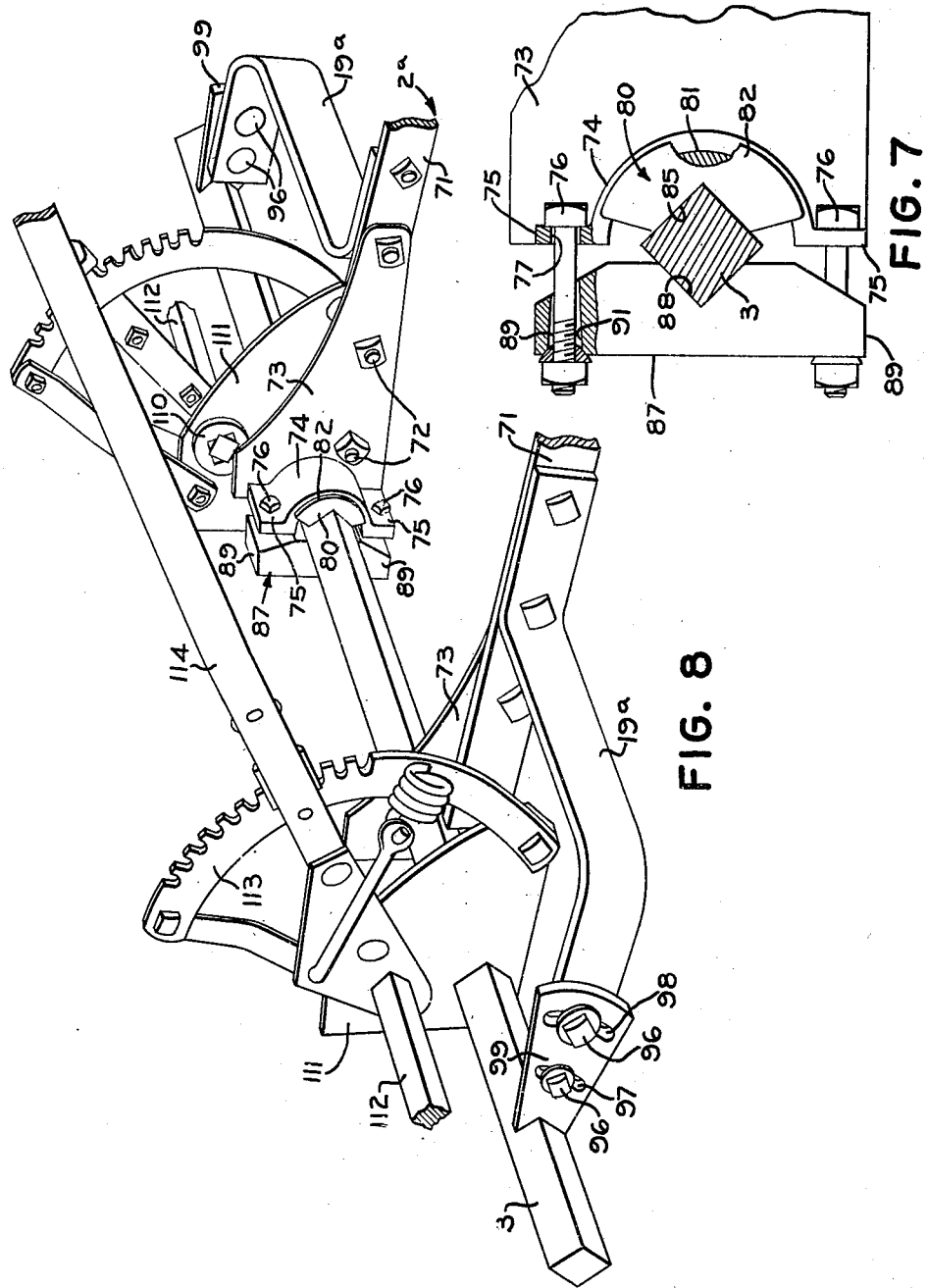
INVENTOR
WALTER H. SILVER
BY
ATTORNEYS Patented Mar. 24, 1953

2,632,373

UNITED STATES PATENT OFFICE 2,632,373

CULTIVATOR TOOL-BAR CONNECTION

Walter H. Silver, Moline, Ill., assignor to Deere & Company, Moline, Ill., a corporation of Illinois Application June 28, 1947, Serial No. 757,867

15 Claims. (Cl. 97—198.1)

1

This application is a continuation-in-part of my co-pending United States application, Serial No. 484,285, filed April 23, 1943, now abandoned, which is a division of my United States application, Serial No. 436,708, filed March 28, 1942, now U. S. Patent 2,385,950, dated October 2, 1945.

The object and general nature of the present invention is the provision of a new and improved connection between a tool or tool means and its support. Particularly, it is one object of this invention to provide new and improved connections, especially adapted for mounting earth working tools on the tool bar of a cultivator or other agricultural implement. Specifically, it is one feature of this invention to provide connections arranged so that under certain conditions the tool may move relative to the tool bar generally about the axis of the latter. More specifically, it is a feature of this invention to provide connections that accommodate the disposition of the tool in different positions generally about the axis of the tool bar.

Still further, another feature of this invention is the provision of improved connecting means between the ground working tools and the tool bar of the implement frame, so constructed and arranged as to allow for a certain amount of flexibility in the connection, in addition to the aforesaid provision for adjustability. If desired, the feature of flexibility may be retained and the feature of adjustability may be eliminated, or vice versa. Particularly, according to the present invention, the connections may be constructed to include semi-spherical clamping means, especially where stiff shank sweeps are used, to provide for adjusting the tools about the axis of the tool bar. Another feature of this invention is the provision of similar adjustable connections between the tool bar and its support, which may be a wheel frame or the like, whereby all of a plurality of tools may be adjusted simultaneously.

These and other objects and advantages of the present invention will be apparent to those skilled in the art after a consideration of the following description, taken in conjunction with the accompanying drawings in which the preferred form of the invention has been illustrated.

2

Figures 5, 6:
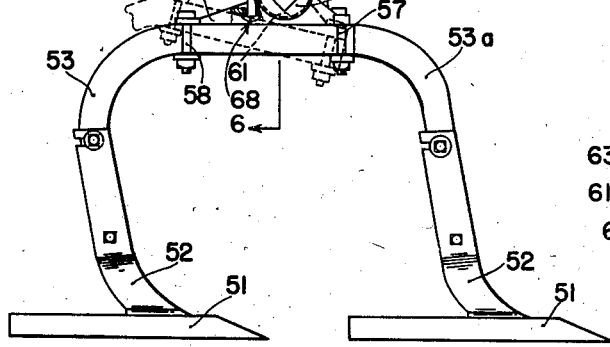
Figure 5 is a view showing an adjustable mounting which is preferred for a stiff shank tool.

Figure 6 is a sectional view taken generally along the line 6—6 of Figure 5;

Figure 7 shows a modified form of the present invention, in which the tool bar connection with the main frame includes an adjustable mounting; and Figure 8 is a fragmentary perspective view showing the adustable connection for one of the frame braces.

Figure 1:
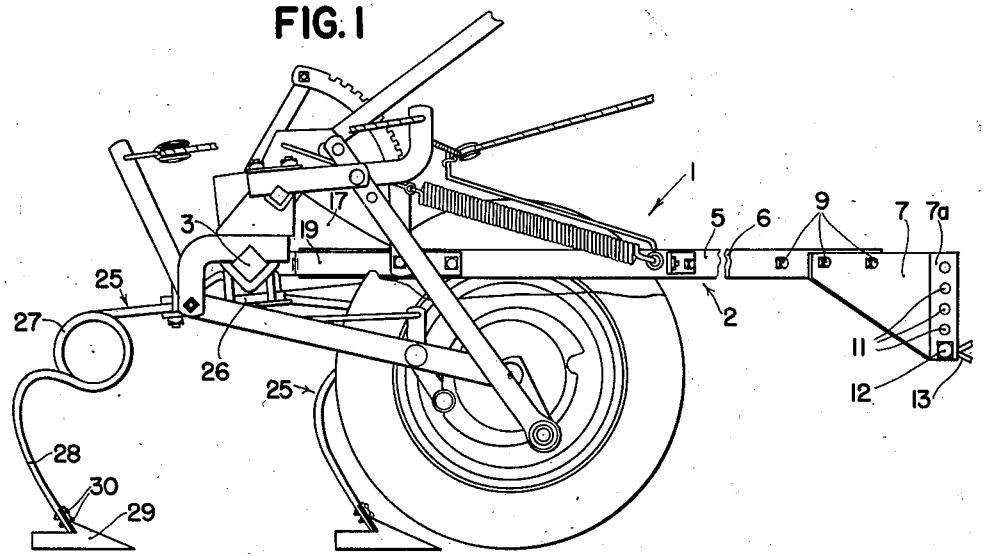
Figure 1 is a side view of a tool bar cultivator in which the principles of the present invention have been incorporated.

Referring now to the drawings, more particularly to Figure 1, the present invention has been illustrated as embodied in a tool bar cultivator of the towed type and is indicated in its entirety by the reference numeral 1. The implement 1 comprises, in general, a laterally disposed frame which is made up of a forwardly extending hitch frame 2 and a transversely disposed tool bar 3 which is polygonal in cross section. The hitch frame 2 includes a pair of bars 5 and 6, the rear portions of which extend in laterally spaced generally parallel relation while the forward portions converge forwardly and receive a pair of hitch plates or clevis jaws 7 which are secured to the bars 5 and 6 by bolts 9. The plates 7 are generally triangular in configuration and have forward parallel portions 7a which are provided with a plurality of apertures 11 in which a draft bolt 12 may be placed in different positions. A draft clevis 13 is mounted on the bolt 12 and extends forwardly and is connected with a drawbar of a tractor or other source of power. The rear ends of the hitch frame members 5 and 6 are secured, as by bolts or the like, to a pair of plates 17 that are welded in laterally spaced relation to the tool bar 3. The latter is reenforced by diagonal braces 19. For other details of the tool frame reference may be had to the patent application identified above.

Figure 3:
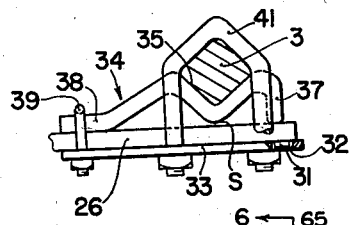
Figure 3 is a view taken generally along the line 3—3 of Figure 2.
Figure 4:
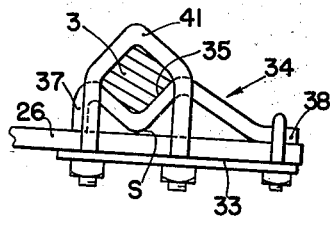
Figure 4 is a view similar to Figure 3 but with certain parts in reversed position, whereby the position of the tool may be changed, as to accommodate a raised or lowered hitch point.

The tool bar 3 is adapted to receive cultivating tools of various kinds. For example, in Figure 1 I have shown the tool bar 3 as receiving a plurality of spring teeth connected with the tool bar 3 and each having a ground working sweep. These tools and the manner in which they are adapted to be connected to the tool bar 3 will now be described. Each spring tooth is indicated by the reference numeral 25 and includes a forwardly extending attaching section 26, a coil spring section 27, and the downwardly extending tool receiving section 28. A sweep 29 is secured, as by bolts 30, to the lower end of the tool receiving section 28. The attaching section 26 of each spring tooth carries a boss 31 (Figure 3) at its forward end that is adapted to be received in an opening 32 formed in a plate 33. The latter is disposed beneath the tool bar 3 and also beneath the attaching section 26. Between the latter and the tool bar 3 a spring cushioning member 34 is placed. Where the tool bar 3 is square in cross section, the member 34 is provided with a central V-shaped section or socket 35 adapted to fit against the under side of the tool bar 3. The member 34 has a downturned end 37 adapted to bear against the upper edge of the spring tooth section 26. The other end of the member 34 extends downwardly at an angle, terminating in a section 38 that extends along the attaching section 26 for a short distance. A U-bolt 39 serves to clamp the section 38 to the spring tooth section 26, the U-bolt 39 extending through apertures in the plate 33. The latter is provided with apertures in the central portion thereof to receive the ends of a pair of U-bolts 41 and 42 that embrace the tool bar 3 and extend downwardly on opposite sides of the spring member 34 and the attaching section 26 of the spring tooth 25. Each of the U-bolts, which serves as a clamping member, is formed to fit the upper side of the tool bar 3, as shown in Figures 3 and 4. Nuts 43 and 44 are disposed on the ends of the U-bolts 41 and 42 and serve to clamp the associated spring tooth to the tool bar 3 firmly and substantially rigidly except for the cushioning action that is provided by the member 34, as will be referred to below. The disposition of the boss 31 in the opening 32 of the plate 33 serves to prevent longitudinal displacement of the spring tooth relative to the plate 33 and the tool bar 3.

Another form of tool that may be attached to the tool bar 3 is the stiff shank sweep, and referring now to Figures 5 and 6, which show the attachment of one of such tools to the tool bar 3, the sweep is indicated by the reference numeral 51 and includes a standard 52 which is attachable to a sweep beam 53. A clamp casting 56 is secured, as by bolts 57 and 58, to the horizontal portion of the beam 53. One portion of the clamp casting 56 is formed as an arcuate section 61 and is adapted to receive a saddle member 59 having side flanges 60. The outer or lower surface of the saddle member 59 is arcuate and is adapted to fit against the arcuate portion 61 of the clamp casting 56 so as to provide for a certain amount of adjustment of the saddle member 59 about an axis that passes through the center of curvature of the arcuate portions, this axis, as shown in Figure 5, coinciding with the axis of the tool bar 3. The upper or inner portion of the saddle member 59 is formed with a socket 63 to receive the lower portion of the tool bar 3. An upper clamp casting 65 having a socket 66 fitting against the upper portion of the tool bar 3 is connected by clamping bolts 67 to the lower clamp casting 56, the heads of the bolts 67 being loosely received, as at 68, by the casting 56. Thus, when the bolts 67 are tightened, the upper clamp casting 65 and the saddle member 59 are firmly and rigidly clamped to the tool bar 3, but when the bolts 67 are loosened, the tool may be adjusted relative to the tool bar 3, generally about the longitudinal axis of the latter. In Figure 5, I have shown the beam 53 as extending generally rearwardly with respect to the tool bar, but if desired another beam 53a, which is similar to the beam 53 but with its sweep-receiving section extended forwardly, may be mounted on the bar 3 in between adjacent beams 53, thus providing a staggered relation, similar to the arrangement of the sweeps in Figure 1.

Figure 2:
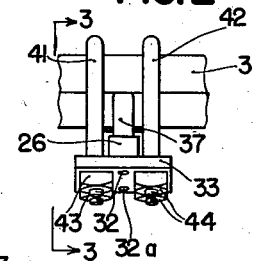
Figure 2 is an enlarged fragmentary end view of the preferred mounting for a spring tooth tool.

It will be noted from Figures 3 and 4 that the cushioning member 34 and the associated plate 33 may be disposed in either of two positions. It will also be seen that the notch 35 is so formed that in one position the tool is disposed at a slightly different angle as compared with the position of the tool when the plate 33 and cushioning member 34 are reversed. In being moved from one angular position to the other, the tool is shifted generally about the axis of the tool bar 3. The end of the plate 33 adjacent the U-bolt 39 is provided centrally with an opening 32a (Figure 2) to receive the lug 31 (Figure 3) when the parts are arranged as shown in Figure 4. This construction, in which the parts 33 and 34 may be reversed (Figures 3 and 4) to dispose the sections 26 at slightly different angles relative to the tool bar 3, makes it possible to adjust the implement for different heights of hitch points or other conditions. Similarly, the position of the tools may be varied, when the construction shown in Figures 5 and 6 is employed, by loosening the clamping bolts 67 and shifting the tools angularly about the tool bar 3.

In Figures 5 and 6 the tools are clamped rigidly to the tool bar 3, but in Figures 3 and 4, a limited amount of cushioned action is provided for. This action is substantially as follows. The soil pressure against the tooth 25 (Figure 1) tends to cause the plate 33 and spring 34 to move in a clockwise direction about the tool bar 3. As understood, this action takes place more or less about the forwardmost edge of the tool bar as an axis, which results in springing the central portion of the part 34 downwardly and at the same time tending to shift the spring 34 generally longitudinally along the spring tooth section 26. This is accommodated by the provision of a small amount of space, indicated at $s$ in Figure 3, between the central portion of the part 34 and the adjacent part of the attaching section 26. The amount of yield is, of course, slight but in practice has proven sufficient to eliminate breakage of the spring tooth sections 26 adjacent the point where they are clamped in place.

Referring now to Figures 7 and 8, in this form of the invention the tool bar 3 is connected with the main support or hitch frame 2a, which is substantially the same as the hitch frame 2 described above with certain minor changes, by means which provides for adjustment of the position of the tool bar relative to its support, rather than adjusting each individual tool relative to the tool bar, whereby all of the tools may where desired be adjusted simultaneously. Of course, provision may be made, as described above, for fixing each tool individually to the tool bar so as to provide for separate adjustment where necessary. The main support or hitch frame 2a includes a pair of bars 71 which extend convergingly forwardly and carry hitch means (not shown) which may be the same as that described above and shown in Figure 1. The rear end of each of the frame bars 71 is bolted, as at 72, to a plate 73 that is apertured to receive the bolts 72. Each plate 73 is provided with an arcuate section 74 having apertured ears 75 and forming a generally U-shaped part which is rigidly secured, as by welding, to the rear edge of the plate 73, which is suitably shaped to receive the arcuate member 74. Clamping bolts 76 extend through the openings 77 in the apertured ears 75.

A saddle member 80, which may be identical with the saddle member 59 described above, is provided with an outer generally cylindrical surface 81 and end flanges 82 which engage with a fair degree of snugness the ends of the arcuate member 74, whereby the parts nest together, as best shown in Figure 7. The opposite side of each saddle member 80 is provided with a socket 85 to receive the tool bar 3, and the parts are so arranged that when the socket member is adjusted in the member 84, the bar 83 and saddle member 80 are shifted generally about the axis of the bar 3 as a center. An outer clamp member 87 is formed with a socket 88 to receive the other side of the tool bar 3, and the clamping member 87 has apertured ears 89 to receive the outer ends of the clamping bolts 76. Preferably, the apertures 91 in the clamping cap 87 receive the bolts 76 with sufficient looseness to accommodate the desired amount of shifting of the tool bar 3 and the associated saddle member 80 relative to the frame 2a, which may readily be done by loosening one clamping bolt 76 and tightening the other until the desired adjustment is secured. It will be noted that in effecting the adjustment just mentioned, all tools that are connected with the tool bar 3 are simultaneously adjusted.

Like the frame 2, shown in Figure 1, the frame 2a is provided with reenforcing braces which are indicated by the reference numeral 19a in Figure 8. The forward ends of these braces are connected to the frame bars in the same way as they are connected in the form of the invention shown in Figures 1 et al., but the rear end of each of these brace members is connected with the bar in such a way as to provide for the rocking of the tool bar 3 relative to the frame, as described above. Accordingly, the rear end of each of the brace bars 19a carries a pair of bolts 96 which are respectively disposed in a pair of slots 97 and 98 formed in an attaching lug 99 that is welded to the tool bar 3 at each side of the connection of the main frame therewith. Thus, by loosening the bolts 96, the bar 3 may readily be adjusted relative to the frame 2a in the manner set forth above, and after the adjustment has been made, the bolts 96 are retightened, thus rigidly securing the brace bar to the tool bar.

Where provision is made, as described above, for adjusting the position of the tool bar 3 relative to the main frame or support 2a, the raising and lowering rockshafts, together with brackets and other parts therefor, must therefore be mounted on the tool bar 3 so as to be capable of movement relative to the frame to which the bar 3 is adjustably connected. Accordingly, I mount a pair of bearing brackets 111, one on each side of the frame bars 71, and fixedly secure the same to the tool bar 3, preferably by welding. Each bracket 111 includes bearing means 110 to receive the inner end of the associated rockshaft 112, by which the carrying wheels of the implement may be raised or lowered, as described in detail in the patent identified above. Also, the bracket 111 carries a sector 113 over which an adjusting hand lever 114, that is fixed to the inner portion of the rockshaft 112, is moved in shifting the rockshaft 112 and the associated raising and lowering arms. Thus, when adjusting the position of the tool bar 3 relative to the frame 2a, the hand levers 114, the rockshafts 112, and associated parts move bodily with the tool bar. In this way, for example, the front end of the hitch frame may be raised or lowered relative to the tools or other parts, as desired.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural machine, a tool bar of polygonal cross section, a tool to be fixed thereto, a clamping member formed to fit one side of said tool bar in non-rotatable relation, means connecting said tool with the other side of the tool bar accommodating rotation of the tool relative to the tool bar about an axis, and a pair of clamping bolt means disposed at opposite sides of said tool bar and connecting said tool and clamping member whereby loosening one bolt means and tightening the other serve to adjust the position of the tool relative to the tool bar.

2. In an agricultural machine, a tool bar of polygonal cross section, a tool to be fixed thereto, a clamping member formed to fit one side of said tool bar in non-rotatable relation, means connecting said tool with the other side of the tool bar accommodating limited rotation of the tool relative to the tool bar, said means including a resilient cushioning member, and means cooperating with said clamping member for holding said tool and said cushioning member in position on said tool bar.

3. In an agriculture machine, a tool bar of polygonal cross section, a tool to be fixed thereto, a clamping member formed to fit one side of said tool bar in non-rotatable relation and extending beyond the other side of said tool bar, a resilient member shaped to fit the other side of said tool bar and having ends engaging said tool, and a clamping plate receiving the ends of said clamping member at said other side of the tool bar and cooperating with said clamping member for holding said resilient member and said tool on said tool bar.

4. In an agricultural machine, a tool bar of polygonal cross section, a tool to be fixed thereto, a U-bolt having its intermediate portion formed to fit one side of said tool bar in nonrotatable relation and extending beyond the other side of the tool bar, said tool including a transverse section, a clamping plate having apertures to receive the ends of said U-bolt, whereby tightening the latter acts through said plate for clamping the tool in position, said tool section and plate having cooperating lug and recess means adjacent the ends of said plate and tool section for holding said tool and plate member against relative displacement, and a resilient member disposed between the other side of said tool bar and said clamping plate and having an end acting against said plate adjacent said lug and recess means.

5. An agricultural machine comprising a frame including a transverse tool bar of non-circular section, a tool adapted to be clamped to said bar, a pair of mating parts having meeting surfaces formed generally as surfaces of revolution, one of said parts being formed to fit against said bar and the other against said tool, whereby the latter may be adjusted angularly about the bar, a clamping member engageable with said tool bar, and means adjustably fixing said clamping member to said tool so as to hold the latter against movement relative to said tool bar.

6. In an agricultural machine, a tool bar of polygonal cross section, a tool to be fixed thereto, a clamping member formed to fit one side of the tool bar, and means disposed between the other side of said tool bar and said tool, said means including a resilient member formed to fit the under side of said tool bar and to accommodate a limited amount of movement of said tool relative to said tool bar.

7. In an agricultural machine, a tool bar of polygonal cross section, a tool to be fixed thereto, a clamping member formed to fit one side of the tool bar, and means disposed between the other side of said tool bar and said tool, said means accommodating a limited amount of rotation of the tool relative to the tool bar generally about the axis of the latter, said means including a pair of semi-cylindrical members, one fitting the underside of said tool bar and the other secured to said tool, movement of one of said semi-cylindrical members relative to the other serving to accommodate a limited amount of movement of said tool relative to said tool bar.

8. In an agricultural machine, a tool bar of polygonal cross section, a tool to be fixed thereto, means connecting said tool with the underside of the tool bar accommodating limited rotation of the tool relative to the tool bar, said means including a resilient cushioning member the ends of which engage said tool and the intermediate portion of which engages said tool bar and is normally out of engagement with said tool, and means for holding said tool and said cushioning member in position on said tool bar.

9. In an agricultural machine, a tool bar of polygonal cross section, a tool to be fixed thereto, a resilient member shaped to fit one side of said tool bar and having ends engaging said tool, the intermediate portion of said resilient member being out of engagement with said tool, and means for clamping said tool bar against said member and the ends of the latter against said tool.

10. In an agricultural implement, a tool bar of polygonal cross section, a tool to be connected to said bar and movable relative to said bar, a clamping member having a socket on its lower side and adapted to receive the upper side of said tool bar, said socket being constructed so as to fit snugly against said upper side of the tool bar, whereby said clamping member is held against movement relative to said tool bar transversely of the latter, means disposed between the lower side of said tool bar and said tool and including a first section having a socket on its upper side and adapted to receive the lower side of said bar, and a second section movable relative to said first section and engaging and movable with said tool relative to said tool bar, and means for holding said clamping member, said sections and tool on said tool bar.

11. In an agricultural implement, a tool bar of polygonal cross section, a tool to be connected to said bar and movable relative to said bar, a clamping member having a socket on one side and adapted to receive one side of said tool bar, said socket being constructed so as to fit snugly against said one side of the tool bar, whereby said clamping member is held against movement relative to said tool bar transversely of the latter, means disposed between the other side of said tool bar and said tool and including a first section having a socket on one side and adapted to receive said other side of said bar and a second section movable relative to said first section and engaging and movable with said tool relative to said tool bar.

12. In an agricultural implement, a tool bar of polygonal cross section, a part adapted to be connected in adjustably fixed relation with respect to said tool bar, a clamping member having a socket on one side and adapted to receive one side of said polygonal tool bar, said socket being constructed so as to fit snugly against said one side of the tool bar, whereby said clamping member is held against movement relative to said tool bar transversely of the latter, means disposed between the other side of said tool bar and said part and including a first section having a socket on one side and adapted to receive said other side of said tool bar and a second section movable relative to said first section and fixedly connected with said part.

13. In an agricultural implement, a tool bar of polygonal cross section, a part to which said tool bar is adapted to be connected, a clamping cap member having a socket on one side adapted to receive one side of said tool bar, means forming an arcuate socket movable with said part, a member disposed between said last mentioned socket and the other side of said tool bar comprising a first section having a socket on one side adapted to receive said other side of said tool bar and a second section movable in the socket carried by said part for adjusting the positions of said tool bar relative to said part, one relative to the other generally about the center of curvature of said arcuate socket, and means acting between said part and said clamping member for fixing said tool bar and part together in different positions of adjustment.

14. The invention set forth in claim 13, further characterized by the socket on said part and said second section having mating surfaces formed generally as surfaces of revolutions about an axis coinciding with the axis of said polygonal tool bar.

15. In an agricultural machine, a tool bar of polygonal cross section, a part to be fixed thereto, a clamping member formed to fit one side of the tool bar, and means disposed between the other side of said tool bar and said part, said means accommodating a limited amount of rotation of the tool bar relative to said part generally about the axis of the tool bar, said means including a pair of semi-cylindrical members, one having at one side a socket non-rotatably receiving the other side of said tool bar and the other side being generally semi-cylindrical and receiving the generally semi-cylindrical member, said latter member being secured to said part, movement of one of said semi-cylindrical members relative to the other serving to accommodate a limited amount of movement of said tool bar relative to said part.

WALTER H. SILVER.

REFERENCES CITED

The following references are of record in the file of this patent:

UNITED STATES PATENTS

| Number | Name | Date |
|---|---|---|
| 118,362 | Hamilton | Aug. 22, 1871 |
| 669,165 | Hartzell | Mar. 5, 1901 |
| 893,311 | Davis | July 14, 1908 |
| 917,762 | Hench | Apr. 13, 1909 |
| 1,097,299 | Carlson | May 19, 1914 |
| 1,410,084 | Viar | Mar. 21, 1922 |
| 1,483,789 | Earhart | Feb. 12, 1924 |
| 2,259,890 | Hipple | Oct. 21, 1941 |
| 2,304,383 | Strandlund | Dec. 8, 1942 |

FOREIGN PATENTS

| Number | Country | Date |
|---|---|---|
| 518,123 | France | Dec. 27, 1920 |